US006174608B1

(12) United States Patent
Bertocchi et al.

(10) Patent No.: US 6,174,608 B1
(45) Date of Patent: Jan. 16, 2001

(54) CERAMIC TILE AND GLAZE FOR USE THEREON

(75) Inventors: Paolo Bertocchi, Arceto; Emanuela Neri; Bruno Burzacchini, both of Modena; Marzia Barattini, Cognento, all of (IT)

(73) Assignee: Ferro (Italia) SRL, Casinalbo (IT)

( * ) Notice: Under 35 U.S.C. 154(b), the term of this patent shall be extended for 0 days.

(21) Appl. No.: 09/190,805

(22) Filed: Nov. 12, 1998

(30) Foreign Application Priority Data

Nov. 27, 1997 (EP) .................................................. 97120868

(51) Int. Cl.$^7$ ................................ B32B 9/00; B32B 17/06
(52) U.S. Cl. ........................ 428/426; 428/427; 428/428; 428/432; 501/14; 501/21; 501/23; 501/26
(58) Field of Search .................................. 428/426, 432, 428/701, 702, 427, 428; 501/5, 14, 21, 23, 26

(56) References Cited

U.S. PATENT DOCUMENTS

| 3,627,861 | 12/1971 | Timke ..................................... 264/56 |
| 3,628,989 | 12/1971 | Solmi ..................................... 117/70 |
| 3,651,184 | 3/1972 | Everhart et al. ....................... 264/56 |
| 3,804,666 | 4/1974 | Eppler et al. ......................... 117/125 |
| 3,871,890 | 3/1975 | Eppler et al. .......................... 106/48 |
| 4,004,935 * | 1/1977 | Grovesnor et al. .................... 106/48 |
| 4,200,468 | 4/1980 | Hurley, Jr. ............................. 106/48 |
| 4,805,551 | 2/1989 | Marazzi ................................. 118/64 |
| 5,091,345 * | 2/1992 | Becker et al. ......................... 501/14 |
| 5,190,708 | 3/1993 | Vitaliano et al. ...................... 264/62 |
| 5,447,891 | 9/1995 | Spinosa et al. ....................... 501/16 |
| 5,568,391 | 10/1996 | Mckee ............................. 364/469.01 |

FOREIGN PATENT DOCUMENTS 0445876  3/1991  (EP) .

OTHER PUBLICATIONS

Leonelli et al., "Li2O–SiO2–A12O3–Me O Glass–Ceramic Systems for Tile Glaze Applications" J. Am. Ceram. Soc. 74 (1991) pp. 983–987.

Copy of European Search Report for corresponding EP Appl. No. 97120868.1.

\* cited by examiner

*Primary Examiner*—Timothy M. Speer
*Assistant Examiner*—Bryant Young
(74) *Attorney, Agent, or Firm*—Rankin, Hill, Porter & Clark LLP

(57) ABSTRACT

The present invention provides a ceramic tile and a glaze composition for use in forming the tile. The glaze composition comprises a glass component, an expansion modifier and a spodumene crystallization promoter. The spodumene crystallization promoter comprises a material that promotes the formation of beta spodumene during the firing of the glaze composition.

9 Claims, No Drawings

CERAMIC TILE AND GLAZE FOR USE THEREON

FIELD OF INVENTION

The present invention concerns a ceramic architectural tile and a glaze composition for use in forming such tile.

BACKGROUND

The prior art provides various methods for forming ceramic tiles for architectural applications, and it also provides various glaze compositions which are used to produce the top surface or wear surface of the tile.

Generally, the formation of a ceramic tile involves the steps of forming a raw tile or an unfired ceramic body. Such ceramic bodies are formed from batches of natural or synthetic raw materials such as clay, kaolin, feldspar, wollastonite, talc, calcium carbonate, dolomite, calcined kaolin, oxides such as alumina, silica, corundum and mixtures of the foregoing. Binders and other additives may also be employed to increase the raw mechanical strength of the body.

Once formed, the bodies are fired to form a biscuit that is hard, tough and brittle. In many instances, a glaze composition is applied to the biscuit and given a further firing (double firing) in order to vitrify or sinter the glaze, depending upon the degree of firing. Upon firing the glaze develops a vitreous, transparent or opaque surface that can be glossy or dull (matte), or somewhere in between glossy and dull. Glazes generally comprise one or more glass frits, fillers, pigments and other additives.

In addition to double firing, it is well-known in the prior art to produce tiles by a single fire approach. In the single fire approach, the glaze is applied to the raw ceramic body, and the body and the glaze are then subjected to a single firing operation in order to produce the finished tile.

SUMMARY OF THE INVENTION

The present invention provides a new and improved ceramic architectural tile and a new and improved glaze composition for use thereon. The glaze composition of the present invention provides a glaze finish that displays excellent abrasion resistance. More particularly, the glaze displays a degree of abrasion resistance that exceeds all the test criteria of ISO 10545-7 (1993). The glaze composition of the present invention is also capable of producing a smooth finish that is semi-transparent in appearance.

A ceramic tile made in accordance with the present invention comprises a fired ceramic body portion and a glaze coating on at least a portion of the surface of the ceramic body portion. The glaze coating is formed by firing a composition comprising a glass composition, an expansion modifier and a spodumene crystallization promotor, In a preferred embodiment the glass composition comprises from about 40% to about 82% by weight $SiO_2$, from about 5% to about 32% by weight $Al_2O_3$, up to about 15% by weight CaO, up to about 20% by weight BaO, up to about 10% by weight MgO, up to about 15% by weight ZnO, up to about 4% by weight $K_2O$, up to about 4% by weight $Na_2O$, from about 5% to about 13% by weight $Li_2O$, up to about 5% $ZrO_2$, up to about 5% by weight $TiO_2$, up to about 3% by weight $P_2O_5$ and up to about 5% by weight $B_2O_3$. The glass composition may also include up to 10% by weight PbO. However, the use of lead oxide is not required.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The green or unfired ceramic bodies that form the tiles of the present invention may be formed using conventional technologies and methods. Both single fire and multiple fire techniques may be employed.

In the case of the single fire approach, the raw tile is not previously fired, the application of the glaze composition being made on the green or unfired ceramic body. After application of the glaze composition, the coated tile is subjected to a kiln or similar heating device and the body and glaze are then simultaneously fired. In the case of the double fire approach, the glaze composition is applied to a previously fired body, and then the glaze and body are fired, the body thus being subjected to two firing operations.

The glaze composition of the present invention may be applied using any one of a variety of conventional application techniques and also in any one of various forms. For example, the glaze composition may be applied wet or dry. Such application techniques as disk and bell applications, spraying, screen printing, brushing and electrostatic application may be employed.

The glaze composition of the present invention includes a glass composition, an expansion modifier and a spodumene crystallization material or promoter.

The glass composition is formed from one or more glass frits using conventional glass melting techniques. Set forth below is the composition for the glass composition.

| Component | Range (Wt %) | Preferred Range (Wt %) |
| --- | --- | --- |
| $SiO_2$ | 40–82 | 57–82 |
| $Al_2O_3$ | 5–32 | 5–24 |
| CaO | 0–15 | 0–10 |
| BaO | 0–20 | 0–18 |
| MgO | 0–10 | 0–5 |
| ZnO | 0–15 | 0–12 |
| $K_2O$ | 0–4 | 0–2 |
| $Na_2O$ | 0–4 | 0–1 |
| $Li_2O$ | 5–13 | 6–13 |
| $ZrO_2$ | 0–5 | 0–4 |
| $TiO_2$ | 0–5 | 0–4 |
| $P_2O_5$ | 0–3 | 0–2 |
| $B_2O_3$ | 0–5 | 0–4 |
| PbO | 0–20 | 0–10 |

The glass frits of the present invention can be melted in a conventional manner including through the use of a continuous melter, discontinuous melters such as rotary melters and refractory crucibles at temperatures of from about 1400°–1600° C. The glass melt may be handled by suitable conventional means though typically it is quenched by steel rolls into flake or frit, using techniques well-known to those skilled in the art.

Various expansion modifiers may be included in the glaze composition in order to help ensure a good expansion match as between the resultant glaze coating and the tile body. Examples of such modifiers include quartz, zirconia, spinels and mixtures thereof Additionally, it will be appreciated that depending upon the specific application, an intermediate or engobe layer may be employed between the tile body and the layer of glaze.

Upon firing, the glaze composition displays a beta spodumene crystal structure. Preferably, the glaze displays at least about 30% by volume beta spodumene. Preferably, the beta spodumene does not exceed about 70% by volume of the structure of the fired glaze. It will be appreciated that in addition to beta spodumene, other phases such as virgilite may form. In order to ensure such beta spodumene structure, the glaze composition includes a material that promotes the formation of beta spodumene during firing. Examples of spodumene crystallization promoters suitable for use in the present invention include materials such as, for example, spodumene, eucryptite, alumina, amblygonite, calcium phosphate, petalite, and mixtures of the foregoing.

The glass components, the expansion modifiers and the spodumene crystallization promoters define or form the solids portion of the glaze composition. In addition to the "solids portion," it will be appreciated that the glaze composition may include other additives and fillers such as vehicles, flocculants, antifoaming agents, deflocculants, binders, wetting agents, antifoaming agents, dyes, pigments, tin oxide, zirconium oxide, silicates to opacify the glaze, zinc oxide, wollastonite, feldspar, dolomite and magnesium carbonate may be employed.

Generally, the solids portion of the glaze composition comprises from about 70% to about 99% by weight glass component, from about 0% to about 40% by weight expansion modifier, and from about 0.5% to about 50% by weight spodumene crystallization promoter.

The glaze composition is made according to the following technique. The glass frit(s), in flake or granular form, expansion modifier(s), spodumene promoter(s) and other additives are ball milled with water (finely milled to an average size of about 10–15 microns). The resulting slip, which comprises generally from about 30% to about 50% water, is then in condition for application upon a green ceramic body. Of course, it will be appreciated that the amount of water utilized in a slip can be varied to best accommodate the specific application technique being employed. Also, instead of water, other conventional vehicles may be employed. Alternatively, if the glaze composition is intended for dry or electrostatic application, the glaze can be dry milled or granulated. Other additives, such as, for example, glues, binder, organopolysiloxanes may be employed in the dry system. It will be appreciated that the glaze compositions of the present invention may be applied utilizing various application techniques, for example, screen printing, spraying, brushing, hand printing or painting, electrostatic application or using other methods that are known in the art.

Firing times greatly depend on such factors as the previous firing history of the ceramic body, furnace conditions, and the size of the charge or load placed in the furnace or kiln. However, generally, the coated ceramic bodies are fired for a period of from about 15 minutes to about 8 hours. Generally, the glaze compositions of the present invention mature at a temperature of from about 900° to about 1250°.

A glaze made in accordance with the principles of the present invention displays excellent abrasion resistance. Generally, such glaze displays an abrasion resistance which displays nearly one-half the weight loss due to abrasion as compared to a conventional floor tile. More particularly, such glazes are capable of passing the criteria for Class 5 of ISO 10545-7 (1993). Class 5 is the most stringent level of abrasion resistance defined by such standard. This standard is also known as EN154 in Europe.

By way of illustration and not by any limitation, the following examples will describe specific compositions within the scope of the present invention. Unless otherwise indicated, all parts and percentages are by weight, and all temperatures in degrees Centigrade (° C.). The frit and glaze compositions utilized in Examples 1–4 are specified below. The frit compositions were prepared utilizing conventional melting techniques. The tile bodies employed in the Examples were conventional in nature, composed principally of clay with silica, feldspar and other conventional additives included.

EXAMPLE 1

Floor tile was made with single fast firing technology. First, glaze composition 1 was prepared by milling in 60 parts of water for every 100 parts of dry charge. The milling residue on a 40 microns sieve being 0.1–0.2% for 100 parts of dry charge. The glaze was applied on a dried green tile body with a suitable engobe (an engobe available from Ferro (Italia) SRL of Casinalbo, Italy, under the trade designation FE.ENG 304). The glaze was applied at a rate of 1.25–1.5 kg/m$^2$. The tile was then subjected to a firing cycle of 50 minutes in length with maximum temperature of 1180° C. The resultant tile had a smooth surface with 27% of reflected light (measured with 60° angle). The glaze also exhibited a sufficient and good transparency to allow underglaze decoration and abrasion resistance—the loss in weight after 12000 revolutions MCC (according to EN154 std but longer run) being about 0.22 grams. The surface is not attackable by acids and bases (class AA according EN122 std).

EXAMPLE 2

Wall-floor tile was made using single fast firing technology ("monoporosa"). First, glaze composition 2 was prepared as in Example 1. The glaze was then applied on a dried green tile body with suitable engobe (available from Ferro (Italia) SRL of Casinalbo, Italy, under the trade designation FE.ENG1039. The glaze was applied at a rate of 1–1.3 kg/m$^2$. The tile was then subjected to a firing cycle of 45 minutes in length with a maximum temperature of 1140° C. The resultant tile had a smooth surface with 18% of reflected light (measured with 60° angle). The glaze also exhibited sufficient transparency to allow underglaze decoration. The surface is not attackable by the acids and bases (class AA according EN122 std.).

EXAMPLE 3

Wall tile was made with double fast firing technology. First, glaze composition 3 was prepared as in Example 1. The glaze was then applied on a fired tile body over suitable engobe (available from Ferro (Italia) SRL of Casinalbo, Italy, under the trade designation FE.IT1726). The glaze was applied at a rate of 1–1.3 kg/m$^2$. The tile was then subjected to a firing cycle of 30 minutes in length with a maximum temperature of 1030° C. The resultant tile had a smooth surface with 12% of reflected light (measured with 60° angle). The glaze also exhibited sufficient transparency to allow underglaze decoration. The surface is not attackable by the acids and bases (class AA according to EN122 std.).

EXAMPLE 4

Wall tile was made with traditional double firing technology. First, glaze composition 4 was prepared as in Example 1. The glaze was then applied on a fired tile body over suitable engobe (available from Ferro (Italia) SRL of Casinalbo, Italy, under the trade designation FE.IT1726). The glaze was applied at a rate of 1–1.3 kg/m$^2$.

The tile was then subjected to a firing cycle of 8 hours in length with a maximum temperature of 1030° C. The tile had a smooth surface with 8% reflected light (measured with 60° angle). The tile also exhibited good transparency. The surface is not attackable by the acids and bases (class AA according EN122 std.).

Glaze Composition
(Parts By Weight)

|  | 1 | 2 | 3 | 4 |
|---|---|---|---|---|
| Frit A | 25 | 55 | 45 | 65 |
| Frit B | 35 |  |  |  |
| Frit C |  |  | 10 |  |
| Quartz | 35 | 30 | 25 | 30 |
| Spodumene | 5 | 15 | 5 | 5 |
| Wollastonite |  |  | 15 |  |
| Kaolin | 5 | 5 | 5 | 5 |
| Na-Polyphosphate | 0.2 | 0.2 | 0.2 | 0.2 |
| Glue (CMC) | 0.2 | 0.2 | 0.2 | 0.2 |

Glass Frit Compositions
(% By Weight)

|  | Frit A | Frit B | Frit C |
|---|---|---|---|
| $SiO_2$ | 70 | 57.7 | 82 |
| $Al_2O_3$ | 11.2 | 23.7 | 5.1 |
| CaO | 10.9 | 7.8 | 0.1 |
| MgO | 0 | 4.1 | 0 |
| $K_2O$ | 1.2 | 0.1 | 0.1 |
| $Na_2O$ | 0.2 | 0.2 | 0 |
| $Li_2O$ | 6.5 | 6.6 | 12.7 |

In summary, the present invention affords a glazed tile wherein the glaze displays high mechanical resistance such as high abrasion resistance. Furthermore, the glaze is capable of producing a smooth finish that may be glossy or dull (matte), semimatte, or semitransparent in appearance if desired. Of course, it will be appreciated that by using specific additives, the glaze can be utilized to produce surfaces that are opaque, semiopaque or semitransparent. Additionally, the glaze of the present invention may be applied at significant thicknesses to facilitate mechanical polishing of the surface. Finally, it will be appreciated that in addition to tile, the glaze composition of the present invention may be utilized in conjunction with other ceramic bodies such as, for example, chinaware, dinnerware, fine bone china and sanitary ware.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

What is claimed:

1. A ceramic tile comprising a fired ceramic body portion and a glaze coating on at least a portion of the surface of said ceramic body portion having an abrasion resistance that meets the criteria of Class 5 of ISO 10545-7 (1993), said glaze coating formed by firing a composition comprising a glass composition, an expansion modifier and a spodumene crystallization promoter.

2. A ceramic tile as set forth in claim 1 wherein said glass composition comprises from about 40% to about 82% by weight $SiO_2$, from about 5% to about 32% by weight $Al_2O_3$, up to about 15% by weight CaO, up to about 20% by weight BaO, up to about 10% by weight MgO, up to about 15% by weight ZnO, up to about 4% by weight $K_2O$, up to about 4% by weight $Na_2O$, from about 5% to about 13% by weight $Li_2O$, up to about 5% $ZrO_2$, up to about 5% by weight $TiO_2$, up to about 3% by weight $P_2O_5$, up to about 5% by weight $B_2O_3$ and up to 20% by weight PbO.

3. A ceramic tile as set forth in claim 1 wherein said spodumene crystallization promoter comprises a material selected from the group consisting of beta spodumene, eucryptite, alumina, amblygonite, calcium phosphate, petalite and mixtures thereof.

4. A ceramic tile as set forth in claim 1 wherein said expansion modifier comprises a material selected from the group consisting of quartz, zirconia, spinels and mixtures thereof.

5. A ceramic tile as set forth in claim 1 wherein said glass composition comprises from about 57% to about 82% by weight $SiO_2$, from about 5% to about 24% by weight $Al_2O_3$, up to about 12% by weight CaO, up to about 18% by weight BaO, up to about 5% by weight MgO, up to about 12% by weight ZnO, up to about 2% by weight $K_2O$, up to about 1% by weight $Na_2O$, from about 6% to about 13% by weight $Li_2O$, up to about 4% $ZrO_2$, up to about 4% by weight $TiO_2$, up to about 2% by weight $P_2O_5$ and up to about 4% by weight $B_2O_3$.

6. A glaze composition for use in forming a glaze layer upon a ceramic body, said glaze composition comprising a glass composition, an expansion modifier and a spodumene crystallization promoter.

7. A glaze composition as set forth in claim 6 wherein said spodumene crystallization promoter comprises a material selected from the group consisting of beta spodumene, eucryptite, petalite and mixtures thereof.

8. A glaze composition as set forth in claim 6 wherein said glass composition comprises from about 40% to about 82% by weight $SiO_2$, from about 5% to about 32% by weight $Al_2O_3$, up to about 15% by weight CaO, up to about 20% by weight BaO, up to about 10% by weight MgO, u up to about 15% by weight ZnO, up to about 4% by weight $K_2O$, up to about 4% by weight $Na_2O$, from about 5% to about 13% by weight $Li_2O$, up to about 5% $ZrO_2$, up to about 5% by weight $TiO_2$, up to about 3% by weight $P_2O_5$, up to about 5% by weight $B_2O_3$ and up to about 20% by weight PbO.

9. A glaze composition as set forth in claim 6 wherein said expansion modifier comprises a material selected from the group consisting of quartz, zirconia, spinels and mixtures thereof.

* * * * *